Nov. 4, 1969   R. E. GELLER   3,476,350
FREEZING DEVICE WITH HELICAL ACTUATOR
Filed May 10, 1967   2 Sheets-Sheet 1
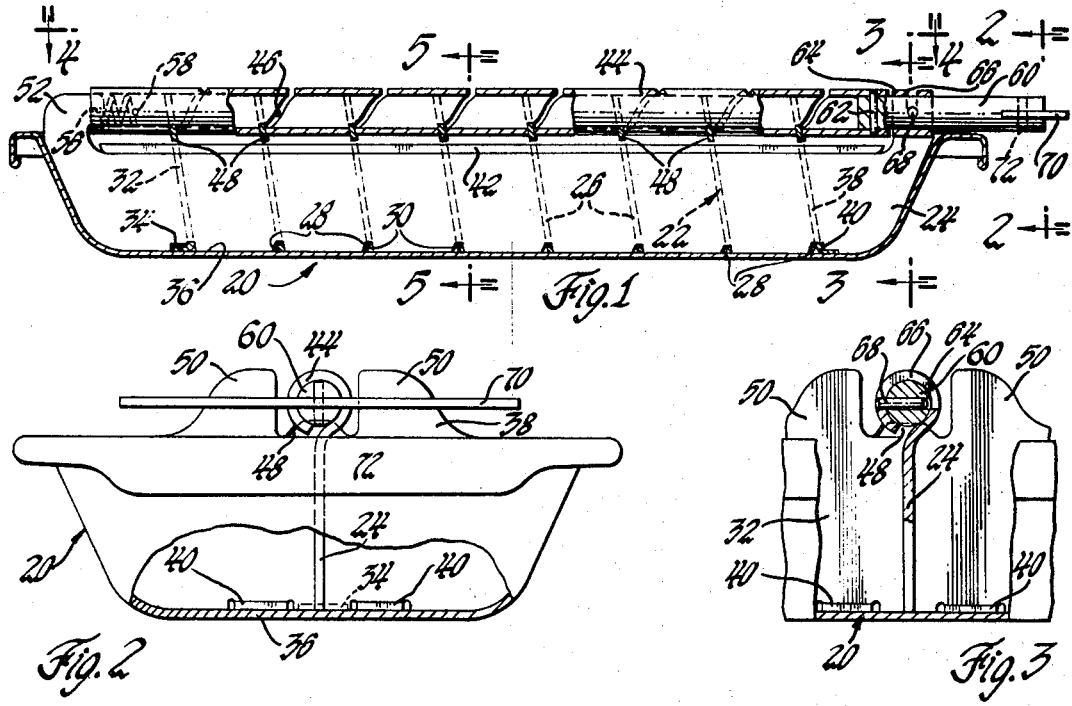
INVENTOR.
Rodger E. Geller
BY
Carl A. Stickel
ATTORNEY Nov. 4, 1969  R. E. GELLER  3,476,350
FREEZING DEVICE WITH HELICAL ACTUATOR
Filed May 10, 1967  2 Sheets-Sheet 2
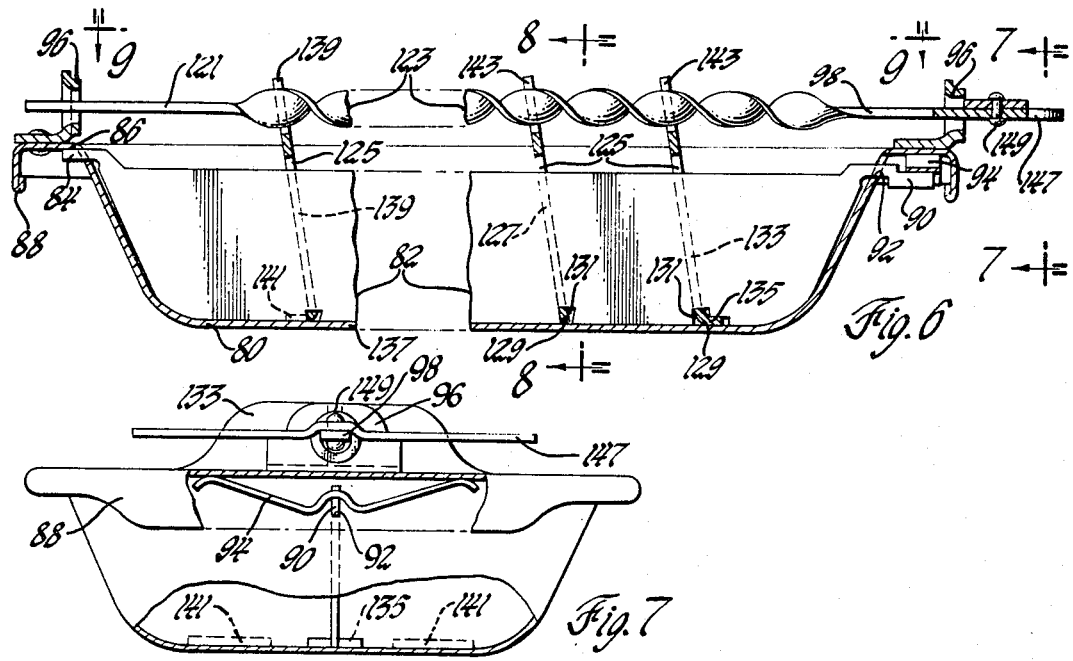
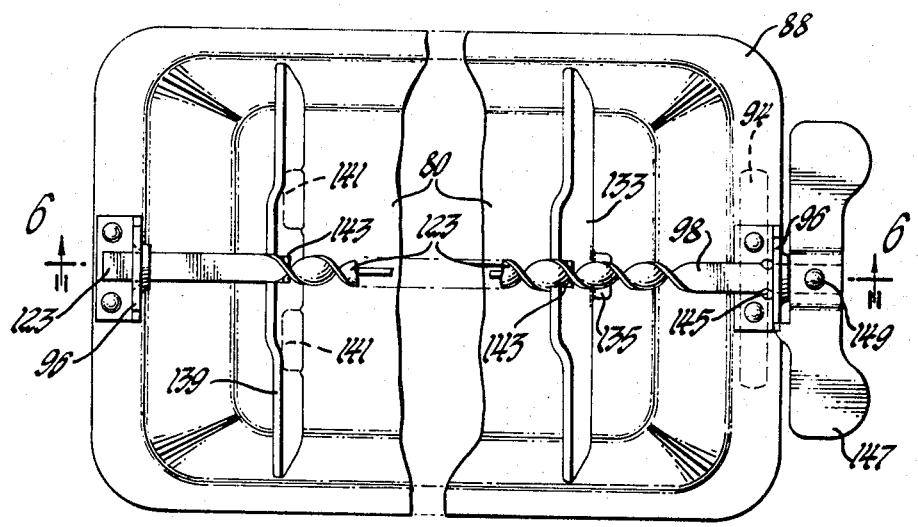
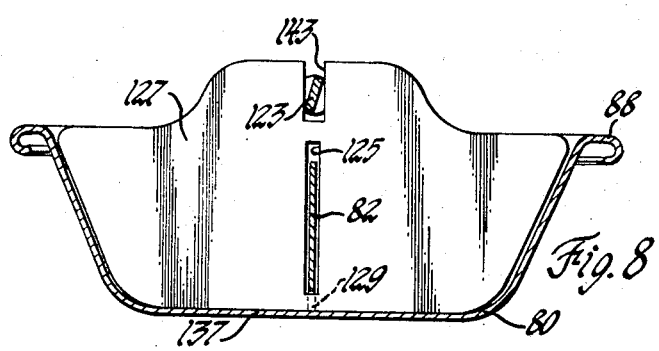
INVENTOR.
Rodger E. Geller
BY
Carl A. Stickel
ATTORNEY

United States Patent Office 3,476,350
Patented Nov. 4, 1969

---

3,476,350
FREEZING DEVICE WITH HELICAL ACTUATOR
Rodger E. Geller, Dayton, Ohio, assignor to General Motors Corporation, Detroit, Mich., a corporation of Delaware
Filed May 10, 1967, Ser. No. 637,456
Int. Cl. F25c 1/24
U.S. Cl. 249—71                                8 Claims

---

ABSTRACT OF THE DISCLOSURE

In the first form, a rolled tube is rotatably mounted upon the ends of the longitudinal wall and provided with a thrust bearing and a torsion spring. A separate helical cam slot is provided for receiving a tongue projecting from each adjacent upright transverse movable wall. Rotation of the handle at one end of the tube progressively moves the transverse walls to eject the frozen cubes from the compartments of the grid and pan. In a second form, a helically twisted flat bar is rotatably mounted in bearings upon the opposite ends of the pan. Each of the upright transverse movable walls of the grid is provided with a slot through which extends the helically twisted flat bar. When the handle in one end of the bar is rotated, the camming action between the cam surfaces of the bar and the slots of the transverse walls progressively moves the transverse walls forwardly to eject the frozen cubes from the compartments of the grid and pan.

---

Although present ice trays and grids are quite simple and inexpensive there are repeated pressures for lower costs, more simple construction and improved operation.

It is an object of this invention to actuate the movable transverse walls of the grid of a freezing device from a rotatable longitudinally extending helical member.

This and other objects are attained in the form shown in the drawings by providing a rotatable longitudinally extending helically slotted tube or twisted flat bar for direct camming engagement with the tongues or slots at the top of each of the movable upright transverse walls of a grid.

Further objects and advantages of the present invention will be apparent from the following description, reference being had to the accompanying drawings, wherein preferred embodiments of the present invention are clearly shown.

In the drawings:

FIGURE 1 is a vertical longitudinal sectional view taken along the line 1—1 of FIGURE 4 of a grid and pan embodying one form of my invention;

FIGURE 2 is an end view of the pan as indicated by the line 2—2 of FIGURE 1;

FIGURE 3 is a fragmentary transverse vertical sectional view taken along the lines 3—3 of FIGURES 1 and 4;

FIGURE 4 is a fragmentary plan view of the grid and pan;

FIGURE 5 is a transverse vertical sectional view taken along the lines 5—5 of FIGURE 1;

FIGURE 6 is a vertical longitudinal sectional view of a grid and pan embodying a second form of my invention taken along the line 6—6 of FIGURE 9;

FIGURE 7 is an end view of the pan taken along the line 7—7 in FIGURE 6;

FIGURE 8 is a transverse vertical sectional view taken along line 8—8 of FIGURE 6; and FIGURE 9 is a plan view of the pan and grid shown in FIGURE 6.

Referring now more particularly to FIGURES 1 to 5, there is shown a freezing device including a pan or tray 20 and a grid 22 formed of an upright longitudinal wall 24 and a plurality of movable upright transverse walls 26. The bottom of the longitudinal wall 24 is provided with a series of substantially uniformly spaced notches 28 which receive the webs 30 at the bottoms of the slots of the transverse walls 26 through which pass the longitudinal wall 24. The rear transverse wall 32 is provided with a rearwardly extending projection or foot 34 normally resting upon the bottom 36 of the pan 20. The front transverse movable wall 38 is provided with a forwardly extending pair of feet 40 normally resting upon the bottom 36 of the pan 20. These feet 34 and 40 tend to hold the transverse walls 26 in the proper position for the freezing operation. The slots in the transverse walls 26 must be made long enough to slip over the ends of the longitudinal wall 24 in order to move their lower webs 30 into the slots 28. The walls 26 are then locked in position by inserting a spacer bar 42 directly above the longitudinal wall 24 through the slots in the transverse walls 26.

According to my invention, the grid is provided with a helical actuator in the form of a rolled tube 44 having a series of short helical cam slots 46 substantially uniform and substantially equally spaced thereon. Each of the transverse walls 26 including the end walls 32 and 38 are provided with a centrally positioned twisted tongue 48 which is twisted to the angle of the helical slots 46 to serve as a cam follower for the helical cam slot into which it projects. If desired, the transverse walls 26 may be provided with a pair of projections 50 on the opposite sides of the tube 44. The longitudinal wall 24 at its rear end is provided with a C-shaped projection 52 which forms a bearing by extending into the rear end of the tube 44. In addition, a torsion coil spring 54 has one end passing through an aperture 56 in the projection 52 and the opposite end extending through an aperture 58 in the rear of the tube 44. The pin 60 fits into the front end of the tube 44 and is locked thereto by a transverse locking pin 62. This pin 60 passes through a front bearing 64 provided by curling an upwardly extending projection at the front of the longitudinal wall 24 around the pin 60. This projection is provided with a slot 66 extending through more than 180° into which projects the pin 68 which acts as a thrust bearing to take the axial thrust of the helical cam slots 46. A handle 70 is fastened to the front end of the pin 60 by a slot and locking pin 72.

After the pan 20 is filled and the liquid frozen in the compartments of the grid 22, the handle 70 is turned in the clockwise direction to progressively cam forwardly the transverse walls 26 beginning with the front transverse wall 38 and ending with the rear transverse wall 32. The progressive actuation may be provided by slightly increasing the spacing of the slots 46 from front to rear. This progressive actuation is also improved by the slight spring effect or resiliency in the tube 44. If desired, the tube 44 may be made from a flat strip provided with diagonal slots and rolled to form the tube shown in FIGURES 1 to 5.

In the second form of the invention, the pan 80 is provided with a longitudinal wall 82 having a projection 84 at the rear extending through a slot 86 in the rear wall to a position beneath the rear portion of the rim 88 of the pan 80. The front portion of the longitudinal wall is provided with a projection 90 extending forwardly within the slot 92 in the front portion of the rim 88. The transverse wall 82 is locked in place by a transverse spring 94 extending between the rim 88 and the projection 90.

According to the second form of this invention, the front and rear portion of the rim 88 have welded or riveted to it a pair of L-shaped bearings 96. Each of these bearings has an aperture of sufficient diameter to receive and form a bearing for the front and rear ends 98 and 121 of the helically twisted flat bar 123 which forms a helical cam extending parallel to the longitudinal wall 82. The longitudinal wall 82 extends through the central slots 125 in a series of movable upright transverse walls 127. The webs 129 at the bottoms of these slots pivot within a series of substantially uniformly spaced notches 131 in the bottoms of the longitudinal wall 82. The front upright movable wall 133 is provided with a forwardly extending foot 135 normally resting upon the bottom 137 of the pan or tray 80 while the rear transverse wall 139 is provided with a pair of rearwardly extending feet 141 normally resting upon the bottom 137 of the pan 80. These feet 135 and 141 in conjunction with the transverse spring 94 normally hold the transverse walls 127 in the proper position for liquid filling and freezing.

According to this invention, each of the transverse walls 127 is provided with an upwardly extending slot 143 which receives the adjacent portion of the helically twisted bar 123 which forms a helical cam with the edges of the slots 143 forming the cam follower. The flat front end 121 of the bar 123 is staked as indicated by the reference character 145 upon its opposite edges to prevent axial movement forwardly. A transverse handle 147 is fastened by the rivet 149 to the straight front end portion 121 on the opposite side of the front bearing 98 forming a thrust bearing to prevent axial movement of the bar 123 to the left.

After the tray or pan 80 is filled with liquid and frozen, the handle 147 is turned in a clockwise direction. This exerts a camming action by the helical surface of the bar 123 against the vertical edges of the slots 143 with the initial force the greatest upon the front transverse wall 133. After the front wall 133 has been moved to begin the dislodgement of the front cubes, the maximum force will then be applied progressively to the remaining transverse walls consecutively from the front to the rear. This will continue until all of the cubes are loosened. The pan or tray 80 then can be inverted for removal of the cubes. As soon as the cubes are removed, the effect of the spring 94 upon the longitudinal wall 82 and the pivoting effect of the foot 135 will move the transverse walls 127 back to their rearward position which will cause the bar 123 to be turned back to its original position.

In both forms of the invention the pan or tray as well as the grid and bearings may be made of aluminum or other suitable metal or a suitable plastic. The tube and helically twisted bar may be made of stainless steel or aluminum. The tray, grid and all parts may be coated or patterned and coated with suitable anti-adhesive substances.

While the embodiments of the invention as herein disclosed constitute preferred forms, it is to be understood that other forms might be adopted.

What is claimed is as follows:

1. A freezing device including a pan and a grid within the pan forming freezing compartments within the pan, said grid comprising a longitudinal wall and a plurality of spaced movable transverse walls movable relative to said longitudinal wall and said pan wherein the improvement comprises a member extending substantially parallel to said longitudinal wall having substantially helical cam surface means, said plurality of transverse movable walls each having a portion extending substantially into engagement with a portion of said substantially helical cam surface means, and means for limiting the axial movement of and rotatably mounting said member relative to said longitudinal wall for moving said plurality of transverse movable walls.

2. A freezing device as defined in claim 1 in which the member having the substantially helical cam surface means is formed of a twisted multiple sided elongated bar.

3. A freezing device as defined in claim 1 in which the member having the substantially helical cam surface means is formed of a twisted multiple sided elongated bar and each of said plurality of transverse walls is provided with a slot receiving a portion of said member.

4. A freezing device as defined in claim 1 in which the member having the substantially helical cam surface means is formed of a substantially cylindrical member having the substantially helical cam surface means thereon.

5. A freezing device as defined in claim 1 in which the member having the substantially helical cam surface means is formed of a substantially cylindrical member having the substantially helical cam surface means thereon in the form of substantially helical slot means, each of said plurality of transverse walls being provided with a projection extending into a portion of said slot means.

6. A freezing device as defined in claim 1 in which the member having the substantially helical cam surface means is formed of a substantially tubular member having a plurality of substantially helical slots therein, said transverse walls having projections extending into different helical slots of said tubular member.

7. A freezing device as defined in claim 1 in which the member having the substantially helical cam surface means is formed of a substantially tubular member having a plurality of substantially helical slots therein, said transverse walls having projections extending into different helical slots of said tubular member, each of said transverse walls being associated with a different slot.

8. A freezing device as defined in claim 1 in which a torsion spring is connected between said last means and said member having said substantially helical cam surface means.

References Cited
UNITED STATES PATENTS

| | | | |
|---|---|---|---|
| 1,879,400 | 9/1932 | Mitchell | 249—71 |
| 2,509,000 | 5/1950 | Hobson | 249—71 |
| 2,576,591 | 11/1961 | Geyer | 249—72 X |
| 2,181,591 | 11/1939 | Smellie | 249—63 X |

J. HOWARD FLINT, JR., Primary Examiner